A. C. TOWER.
Improvement in Combined Harrow and Clod-Crusher.
No. 130,606. Patented Aug. 20, 1872.
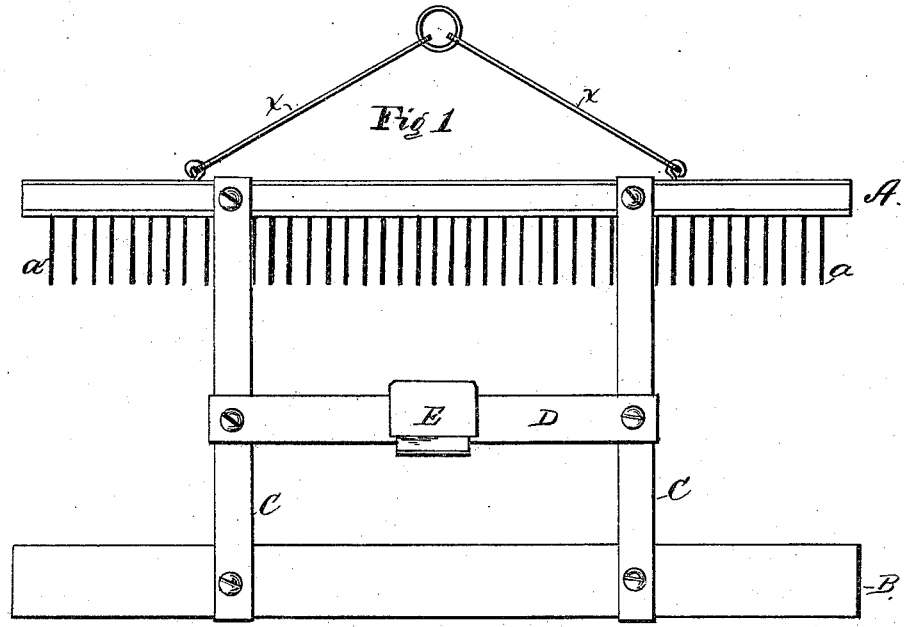
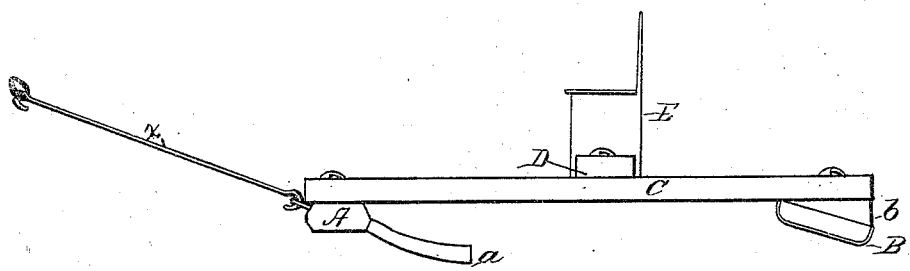
Witnesses  
H. Carlin Clark  
S. J. Noyce
Inventor  
Augustus C. Tower.  
by H. W. Beadle  
Atty

UNITED STATES PATENT OFFICE.

AUGUSTUS C. TOWER, OF TROY GROVE, ILLINOIS.

IMPROVEMENT IN COMBINED HARROWS AND CLOD-CRUSHERS.

Specification forming part of Letters Patent No. 130,606, dated August 20, 1872.

SPECIFICATION.

*To all whom it may concern:*

Be it known that I, AUGUSTUS C. TOWER, of Troy Grove, in the county of La Salle and State of Illinois, have invented a new and useful Implement for Pulverizing Earth; and I do hereby declare that the following is a full and exact description of the same, reference being had to the accompanying drawing and to the letters of reference marked thereon.

This invention has for its object the breaking up and pulverizing of the ground before and after planting, and consists mainly in constructing the machine of a few simple parts, so combined and arranged, as will be fully described hereinafter, as to operate with great efficiency for the purpose for which it is designed.

In the drawing, Figure 1 represents a plan view of my improved machine, and Fig. 2 a side elevation of the same.

To enable others skilled in the art to make and use my invention, I will now proceed to describe fully its construction and manner of operation.

A represents the front beam of the machine, and B the rear beam, the two being connected together by the beams C C, upon which rests the cross-bar D carrying the seat E. The front beam A is provided upon its rear side with a series of knives or teeth, *a a*, which project rearward and downward from the beam in a slanting direction, as shown. The rear beam B is attached to the bars C C, preferably, by means of a triangular block, *b*, so that it is held at an incline and only bears upon the surface of the ground at its rear edge. This beam, preferably, has its lower face covered with zinc. The seat E is so constructed that the space beneath may be used, if desired, for holding stones or other suitable material for increasing the weight of the machine. The front beam is provided with suitable draft attachments, consisting of two rods, *x x*, secured to the front beam at one end and uniting in a ring at the other, as shown.

This machine may be made, of course, of any suitable material and proper dimensions. The following has been found in practice to make an effective machine: Length of each beam, front and rear, eight feet eight inches; number of teeth, fifty-one; each tooth projecting eight inches from the beam, and having a fall of three and one-half inches below the beam. These teeth are placed two inches apart and are made of spring-steel.

The operation is as follows: The machine is drawn across the field in any proper manner. The knives or teeth coming in contact with the clods or lumps of dirt cut them in pieces and leave them for the rear beam, which pulverizes them by its weight. The knives or teeth being arranged in line with each other it is impossible for the clods to dodge them, as may be done with the ordinary harrow. The rear beam, by means of its raised edge, permits the lumps left by the knives to pass beneath it instead of driving them before it, and consequently they are caught and crushed. It will be observed that the teeth, from their peculiar construction and arrangement, are adapted to ride upon the clods and cut down through them from above, so that all danger of carrying the clods on with the machine is obviated.

The machine is simple in its construction, and yet exceedingly effective in its operation.

Having thus fully described my invention, what I claim as new, and desire to secure by Letters Patent, is—

The machine described, consisting of the beam A and the series of fixed curved cutting-teeth *a a*, in combination with the metal-faced beam B and connecting-bars C C, all constructed and arranged as described, for the purpose set forth.

This specification signed and witnessed this third day of July, 1872.

AUGUSTUS C. TOWER.

Witnesses:
 L. B. CROOKER,
 H. C. GIBBS.